US007107293B2

(12) United States Patent
Booz et al.

(10) Patent No.: US 7,107,293 B2
(45) Date of Patent: Sep. 12, 2006

(54) NESTED RECOVERY SCOPE MANAGEMENT FOR STATELESS RECOVERY AGENTS

(75) Inventors: David A. Booz, Rhinebeck, NY (US); Stephen J. Kinder, Hyde Park, NY (US); Matthew J. Sykes, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 10/427,116

(22) Filed: Apr. 30, 2003

(65) Prior Publication Data

US 2004/0220973 A1    Nov. 4, 2004

(51) Int. Cl.
G06F 7/00 (2006.01)
G06F 17/30 (2006.01)
(52) U.S. Cl. ............... 707/202; 707/201; 707/203
(58) Field of Classification Search ........ 707/201–204, 707/1–10, 101–102
See application file for complete search history.

(56) References Cited

U.S. PATENT DOCUMENTS

| | | | |
|---|---|---|---|
| 5,386,544 A | 1/1995 | Nakamura | 714/15 |
| 5,410,684 A | 4/1995 | Airsworth et al. | 714/15 |
| 5,440,726 A | 8/1995 | Fuchs et al. | 714/20 |
| 5,530,802 A | 6/1996 | Fuchs et al. | 714/17 |
| 5,923,833 A | 7/1999 | Freund et al. | 714/19 |
| 5,950,199 A | 9/1999 | Schmuck et al. | 707/8 |
| 5,961,601 A | 10/1999 | Iyengar | 709/229 |
| 6,021,508 A | 2/2000 | Schmuck et al. | 714/4 |
| 6,029,175 A | 2/2000 | Chow et al. | 707/104 |
| 6,065,117 A | 5/2000 | White | 713/159 |
| 6,081,807 A | 6/2000 | Story et al. | 707/101 |
| 6,182,086 B1 | 1/2001 | Lomet et al. | 707/202 |
| 6,330,689 B1 | 12/2001 | Jin et al. | 714/15 |
| 6,490,595 B1 * | 12/2002 | Candee et al. | 707/202 |
| 6,490,624 B1 | 12/2002 | Sampson et al. | 709/227 |

(Continued)

FOREIGN PATENT DOCUMENTS

JP     2000076347 A     3/2000

(Continued)

OTHER PUBLICATIONS

K.F. Forman, L.A. Jones, L.E. Klein and G.J. Romano, System Network Architecture Distribution Services Agent In-Progress Queue Methods and Recovery, IBM Technical Disclosure Bulletin, vol. 38 No. 02 Feb. 1995, pp. 465-472, United States.

(Continued)

Primary Examiner—Leslie Wong
Assistant Examiner—Usmaan Saeed
(74) Attorney, Agent, or Firm—Eugene Shkurko; Cantor Colburn LLP

(57) ABSTRACT

Nested recovery scope management systems and methods for a multiple process computer system having a dynamic multiple address space server are disclosed. Stateless recovery agents are employed, under the control of a supervisory program called Recovery Director, during initialization or restart of servers to restore recoverable data in response to identified failures or other abnormal termination. The Director controls the recovery of protected resources in a systematic manner. The Director is initialized when a first address space of a first server is started. Then, as each instance of a recoverable component is initialized, the component registers with the Director by providing a reference to a stateless recovery agent that can later perform recovery functions for it if needed. As part of the registration, a token representing the current failure scope of the registration is generated and provided to the recoverable component by the Director.

13 Claims, 7 Drawing Sheets

U.S. PATENT DOCUMENTS 6,748,554 B1 * 6/2004 Jin et al. ..................... 714/15
2002/0188711 A1 * 12/2002 Meyer et al. ............... 709/223

FOREIGN PATENT DOCUMENTS

WO      WO9821654      5/1998

OTHER PUBLICATIONS

W.W. Arkeketa, G. Huang, T. Porcaro and P. Theiller, Error-Handling Mechanism for Automated Problem Determination Service Agents on IBM Local Area Network Server Network, IBM Technical Disclosure Bulletin, vol. 29 No. 10 Oct. 1996, p. 191, United States.

* cited by examiner

NESTED RECOVERY SCOPE MANAGEMENT FOR STATELESS RECOVERY AGENTS

BACKGROUND OF THE INVENTION

The present invention relates in general to recovery scope systems and procedures used in large computer systems, such as large database or application servers, a dynamic multiple address space engaged by concurrent processes accessing multiple protected resources such as mass storage devices (disk and/or tape drives), and in particular to recovery scope management systems and methods for recovering protected resources in such an environment, during server restarts and in response to partial server failures, through the use of nested recovery techniques using stateless recovery agents.

Modem computer systems have tremendous computing power, which is needed for large e-commerce applications and other large data handling tasks involving large numbers of transactions. Such advanced computer systems are frequently involved in the reading and writing of large volumes of data to storage devices, such as large-capacity disk drives and tape drives, which are known as protected resources. Such disk drives and tape drives may contain multiple databases and/or large files that need to be accessed and/or updated regularly in a highly reliable fashion, such as the familiar two-phase commit process. The well-documented standard process is designed to satisfy the well-known ACID test for reliable data processing storage. ACID stands for atomicity, consistency, isolation, and durability, which are the four primary attributes which a transaction processing system always attempts to ensure for any transaction. Often, a single business transaction may involve the updating of more than one protected resource, for example a database record. Modem operating system and application management software, with its multiprocessor, multitasking and multithreading capabilities, is able to supervise the processing of thousands of transactions concurrently. There liability of data storage in these transactions are assured in part by the various roles played by transaction managers and resource managers in the overall process, including meeting all of the requirements of the two-phase commit process.

In such large systems, the management and application software may implement such scalability and performance characteristics by distributing work requests to multiple address spaces or server regions The number of server regions required can be managed or otherwise adjusted by work load management systems or monitors to ensure installation performance goals are met. Server regions are therefore dynamically started and stopped based on workload.

In such large systems, the management and application software stops and restarts various server regions associated with transactions being written a single storage device or storage devices. As is explained further below, advanced computer systems dynamically monitor work flow and processing loads, and allocate different controllers and servers to different transactions and operations by the use of multiple concurrent processes. All of this is needed to efficiently handle the large data processing loads, including but not limited to e-commerce and web server environments, where the volume and type of work being performed may change or fluctuate during any given hour or from hour-to-hour and day-to-day.

The present invention is concerned with issues which arise in the restarting of server regions, and the handling of the recoveries from abnormal terminations, such partial or complete server failures, and from shutdowns or other disturbances of the equipment and/or processes resulting in locked or in-doubt transactions subject to efforts to recover from same. Such protected resource usages are normally marked in a recovery log as locked or in-doubt or otherwise assigned a failure status or given a suspect status. In such situations, a recovery manager using conventional procedures normally attempts to recover by either completing or rolling back these affected transactions, or otherwise restoring the data to some well-defined consistent state.

In practice, it can be difficult to determine when the recovery of a protected resource must occur in all situations. "Recovery during restart" methods are generally known in the art. In a typical method of this type, a recoverable component will read some hardened data (e.g., a recovery log) at server initialization to determine what recovery (if any) needs to take place. Once the recovery actions are determined, they take place during server initialization or after initialization completes. Recoveries are often made at the level of individual transactions.

While the recovery during restart method works for simple environments where the server consists of a single address space, the same conventional recovery methods have problems when the server model is extended to multiple processes, such as are found in multiple controller cluster arrangements where each controller typically has one or more server regions. Two significant problems arise during recovery efforts in such environments. First, recoverable components typically attempt to perform recovery during the initialization of each address space. If a new address space is created on behalf of a particular server to handle an increase in workload, for example, the recovery action can adversely effect work that is in-flight and executing in a different address space of the server. In the worst case, this action can produce at least some data integrity problems which might need to be manually addressed and corrected which is time-consuming, error prone and expensive.

The second significant problem arises when components that perform recovery at server restart are not able to perform recovery in the event of a partial server failure. In particular, if a single address space or thread pool contained within a server fails, recovery actions required to put protected resources into a consistent state may not execute until the entire server is restarted. In the case of transactional resources, it sometimes happens that application related data will be locked by a resource manager indefinitely. In other words, in a "recovery on restart" approach, the initialization of the Nth servant region (SR) attempts to perform recovery of protected resources, in accordance with the common practice in the server industry. Such a recovery normally involves examining the server's recovery log and resolving work contained within that log, again in accordance with conventional recovery practices used in single address space environments. It has been found that at times in this kind of multiple server region cluster arrangement, work that the initializing process was attempting to resolve was also currently executing in another process of the server and thus recovery was adversely affected.

Accordingly, there is a need to somehow overcome these two problems in a multiple process computer environment having multiple server regions so that work can more often be successfully recovered in a rapid and preferably fully automatic way to bring the affected protected resources back on line more quickly, while at the same time reliably recovering all transactions and/or data that it is possible to restore to a consistent state.

SUMMARY OF THE INVENTION

In light of the foregoing limitations associated with the known recovery systems and methods, there are provided in accordance with the present invention, novel nested scope management recovery systems and methods for use in multiple processor computer systems designed to overcome these limitations. The recovery systems and methods of the present invention preferably employ stateless recovery agents as described below. When a computer system employs the present invention, the burden of detecting the scope of a failure is removed from the recoverable components and is handled by a supervisory recovery program or component herein called the Recovery Director. Other than the Recovery Director, recoverable components are no longer required (or allowed) to perform autonomous recovery during server region initializations. Instead, they must each register a stateless recovery agent with the Recovery Director during initialization. It is useful here to summarize certain elements that the recovery systems and methods of the present invention preferably contain, followed by a summary of certain advantages which result from use of the present invention.

In an exemplary embodiment of a recovery scope management system of the present invention, for use in a multiple process computer system, the system comprises: (a) a supervisory program for directing recovery of protected resources; (b) a recovery log; (c) at least a first recoverable component having therein a first subcomponent for generating work identifiers representing recoverable operations which may need to be performed at a later time; (d) at least a first stateless recovery agent to assist in any recovery. In practice, there will normally be many recoverable components, and often there may or will be multiple instances of each such component, and there may be one or more recovery agents, and if so, there will often be multiple instances of each. The supervisory program (Recovery Director) preferably includes: a first subcomponent for initializing the recovery log, and a second subcomponent for storing work identifiers in the recovery log, a third subcomponent for examining a recovery log for agents registered therewith and any associated current failure scopes, and a fourth component for selectively notifying a recovery agent to carry out a recovery procedure. When properly arranged, these elements can perform nested recovery sequences that avoid the aforementioned limitations of conventional recovery methods.

In this regard, the recovery log is preferably used by the supervisory program for storing information about the stateless recovery agents in the computer system and for storing work identifiers associated with a recovery scope for them. The recoverable component also preferably has a second subcomponent for registering a recovery agent with the supervisory program. The stateless recovery agent is preferably identified in response to the initialization of a first recoverable component, and is preferably operable to assist in performing recoverable operations in connection with the first recoverable component when instructed to do so by the supervisory program. To accomplish this, the first recovery agent also preferably is able to utilize work identifiers from the recovery log in order to perform recoverable operations in connection with at least the first associated component. Also, the supervisory program preferably includes a fifth component for generating tokens used to reference stored work identifiers associated with recoverable componentsoperable to utilize such a token from the supervisory program as well as the stored work identifiers in the recovery log in order to perform recoverable operations in connection with at least the first associated component.

An exemplary method of the present invention is used in a multiple process computer system having a plurality of regions assigned to a shared resource group. The method assists in the recovery and restoration of protected resources available to the shared resource group that is currently locked or tagged, has been in-doubt or otherwise incomplete for some reason. The method comprises the following steps. Step A: Install a supervisory program for directing the recovery of protected resources whose processing was abnormally terminated. This program is preferably initialized when a first address space of the computer system which may be a server is started. Step B: As each instance of a recoverable component is initialized, register that component with the supervisory program. Preferably during such registration, the recoverable component provides a reference to a stateless recovery agent that is able to perform recovery functions associated with that instance of the recoverable component. Step C: Each recoverable component creates work identifiers for recoverable operations to be performed if an abnormal termination occurs using at least in part information associated with the failure scope token provided to the recoverable component during agent registration. Step D: Employ the supervisory program to identify and group multiple instances of the same recoverable component.

The foregoing steps A–D set the stage for the next phase of the exemplary method, during which nested recovery operations are performed. These operations are carried out by the Steps E–H of the method upon the occurrence of start of a server region or in response to an abnormal termination. Step E: Have the supervisory program determine a failure scope to identify data processing operations that have not been completed and have not been recovered, which data processing operations may be referred to as incomplete failure scopes. Step F: As incomplete failure scopes are identified, have the supervisory program obtain the reference to each stateless recovery agent associated in with such scope. Step G: After obtaining each such reference, use the supervisory program to call each such stateless recovery agent and provide such agent with a token representing the scope. Step H: Pass control to a recovery agent to allow the agent to perform recovery for the specified recovery scope it received via the token, including any recovery scopes nested within it.

Note that during the registration, the supervisory program, also called the Recovery Director, provides the recoverable component with a token or reference to an object that represents the failure scope of this instance of the component which is executing. When the Recovery Director determines that some form of recovery may be required (possibly due to the complete or partial failure of the server), the Recovery Director is responsible for driving an instance (any instance) of the stateless recovery agent in some address space or thread pool within the resource sharing group. The recovery agent is provided the failure scope token of the failure that may need recovery. It is at this point that a recoverable component can look for work within the specified failure scope that requires recovery.

The Recovery Director preferably has certain features which help deliver the following advantages that are not realized, to our knowledge, by known recovery scope management systems and methods currently used in existing computer systems. These features are as follows:

(1) Recoverable components are insulated from determining the scope of a failure.
(2) Failure scopes can be strictly nested. Recovery for a particular scope may encompass more granular scopes. A scope could include a cluster, server, server region, thread pool, pool or unit of work.
(3) Since the recovery operations are directed by a Recovery Directory, the restart and recovery issues associated with component initialization in the Nth address space of a server no longer exist.
(4) The "failure scope token" generated by the Recovery Director facilitates the use of a single log stream by all components in a resource sharing group.
(5) Recoverable components will be directed to perform recovery in the event of a partial server failure. This prevents problems associated with protected resources being held in doubt until a complete server restart occurs.
(6) The combination of a failure scope token, shared log stream, Recovery Director, and stateless recovery agents facilitates peer level recovery across a resource sharing group.

From the description thus far, it should be appreciated that the systems and methods of the present invention are well-suited to overcome the two problems encountered when conventional scope recovery procedures are utilized in a multiple processor computer system accessed by a plurality of operational programs such as recoverable components. These and other aspects of the present invention may be further understood by referring to the detailed description, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where.

DESCRIPTION OF THE PREFERRED EMBODIMENTS

The present invention is illustrated and described herein in connection with certain illustrative embodiments, with the understanding that the teachings of the present disclosure are considered to be exemplifications of the principles of the invention and the associated functional specifications required for implementation of the present invention and its several facets. However, it should be appreciated that the systems and methods of the present invention may be implemented in still different configurations and forms, and that other variations thereof are possible, based on the teachings herein.

Prior to discussing the embodiments of the present invention, it is useful to look more closely at some of the known characteristics of existing multi-process computer systems having a large dynamic multiple address space. One such class of systems is IBM's z900 series computer systems which may be run under IBM's z/OS operating system. Such systems are often used for large web server applications, in which case the well-known WebSphere application software package from IBM is normally also used. WebSphere provides a J2EE-compliant application deployment environment for applications implemented as Java server-side code, and also provides transactional database connectivity and a large variety of web services.

Figure 1:
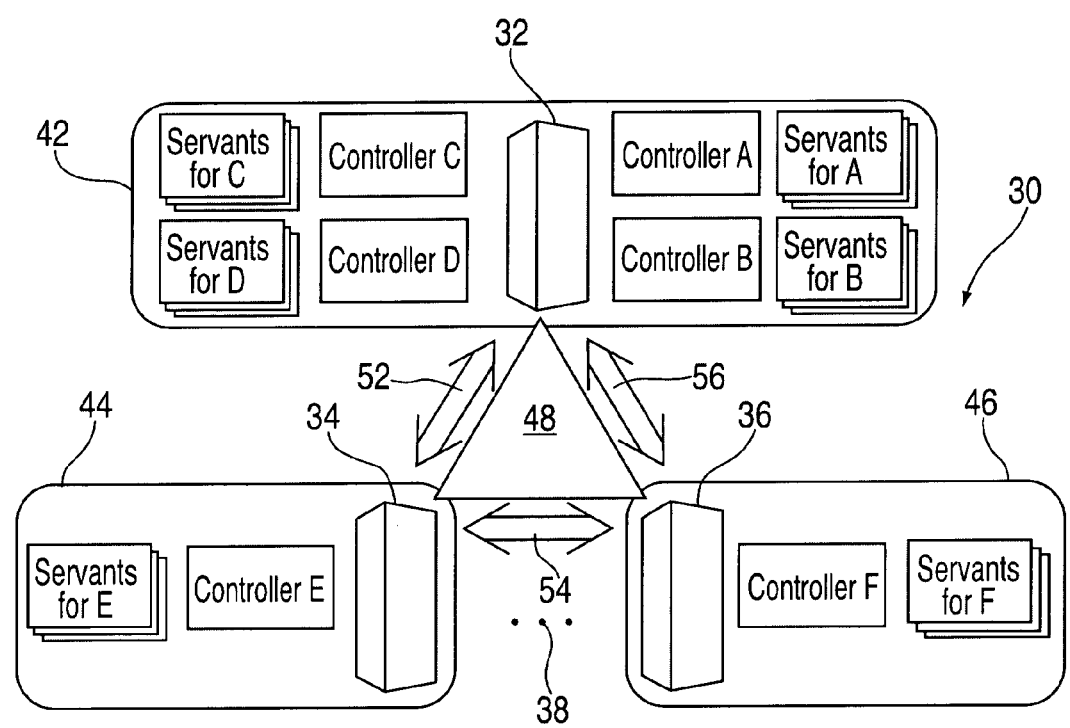
FIG. 1 is a simplified block diagram of a known large computer system having multiple processors, such as might be utilized in a large web application server or a data processing center, which illustrates that each processor in the system may be configured to have one or more controller regions and that each controller region may have one or more servant regions associated therewith.

FIG. 1 illustrates atypical computer system and operating system infrastructure in which the present invention may be used. An exemplary embodiment of the present invention may be utilized in a multiple server-region server environment. The WebSphere application server package when running under a z/OS operating system infrastructure is one such environment having multiple independent processes dynamically sharing a large memory space. Such a system could be used to drive a multiplicity of protected resources, such as disk drives and/or tape drives, punched cards, paper tape, etc., as are often utilized at data processing centers.

As shown in FIG. 1, such a computer system 30 may include a plurality of processors 32, 34 and 36 each of which may have their own separate regions of operation as shown by envelopes 42, 44 and 46. Each region of operation may be associated with its own set of mass storage devices. As indicated by the ellipses 38, there may be additional processors. Also as indicated by the multi-processor interface represented as triangle 48 and by the bidirectional communication and control paths indicated by broad arrows 52, 54 and 56, the processors communicate with one another, and share and/or transfer data, control and status information. In addition, each processor may have a plurality of logical servers installed and operating therein. In the WebSphere for z/OS environment, these processors are typically used as computer servers, and each is configured as a multi-process server which includes a controller process (also known as a Control Region or CR) and a set of Servant processes (also each known as a Server Region or SR). For example, in FIG. 1, processor 32 is shown to have four controllers, namely Controllers A, B, C and D, and each of these controllers has a set of servants (Servants for Controller A through Servants for Controller D). Similarly, server 34 is shown to have a single Controller E, and an associated set of servants (Servants for E), and server 36 is shown to have a single controller, namely Controller F and an associated set of servants (Servants for Controller F). Some, most or all of these servant processes may be associated with data transactions and/or data transfer from or to attached mass-storage devices (such as not limited to disk drives and/or tape drives) or may be involved in handling e-commerce transactions, or the like.

Figure 2:
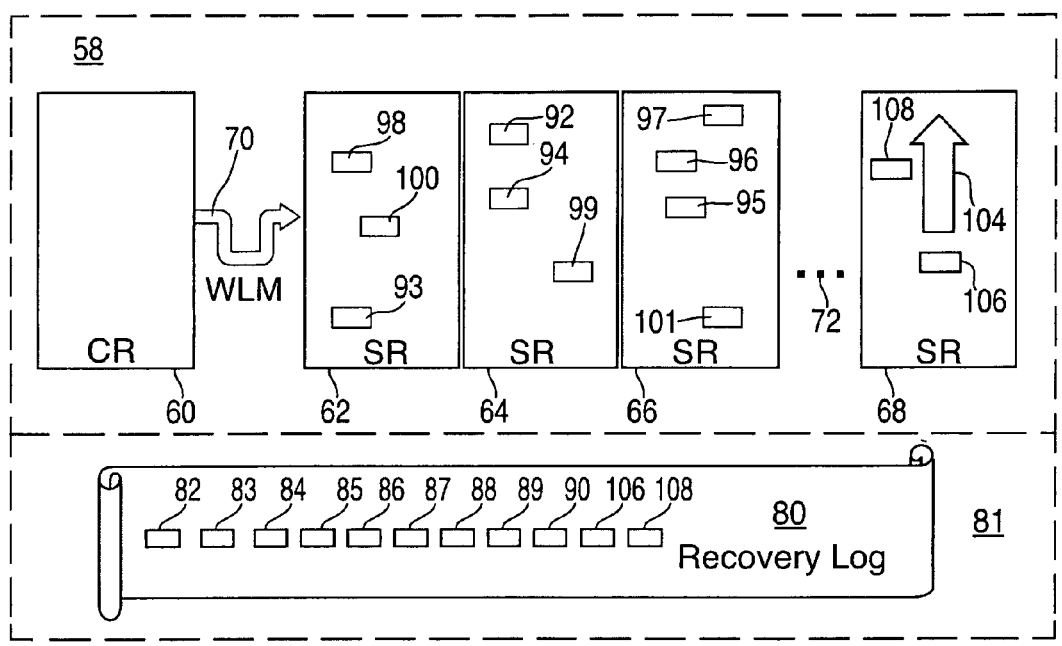
FIG. 2 is a simplified memory space diagram for one of the several controller/servant regions belonging to a given processor in the application server system shown in FIG. 1, which illustrates a multiplicity of techniques and issues, dealing with the management of a recovery log.

FIG. 2 shows a prototypical computer system 58 having a plurality of address spaces, associated with a typical FIG. 1 processor, such as server 32. Within that computer system, space is allocated for Control Region (CR) 60 and its several associated Server Regions (SR). 62, 64, 66 and 68. Broad arrow 70 shows that these Server Regions associated with Control Region 60 are controlled in known fashion by a workload manager (WLM). Ellipses 72 illustrate that this computer sytsem, if desired, may include several more than the four server regions which are shown. The WLM, which operates as part of the control process 60, starts and stops the server regions dynamically based upon the workload goals of the installation. In this environment, system code is initialized in each process as the process starts.

FIG. 2 also shows a recovery log 80. Within this recovery log are a number of references 82 through 90 which correlate to locked or in-doubt resources 92 through 101 that have been accessed by server regions 62, 64 and 66. These blocks represent protected resources which, during the operation of those servant processes were marked as locked or in-doubt because they were or are involved in incomplete transactions, suspect transactions or had some other issue and thus, for whatever reason, can no longer be used until recovered during a restart using conventional recovery techniques.

In conventional multi-process systems, when a server region, such as server region 68 is initialized, recoverable components of that server process attempt to perform recovery for all active records in the component's log. These records represent the protected resources that were accessed across the entire set of address spaces allocated to all of the associated servant processes, which includes various locked or in-doubt protected resources. This recovery would often involve examining the recovery log 80 for server 32 and resolving incomplete work contained in that log, represented by blocks 82 through 90. Work that the initializing process, represented by broad arrow 104 in server region 68, attempted to resolve from its own old now defunct work space may be successfully recovered, as represented by blocks 106 and 108 shown in server region 68, since these were not being used by any other process. However, with respect to other blocks such as locations 92 through 100 in server regions 62, 64 and 68, these locations represent locked or in-doubt locations previously marked by processes which had executed or are currently executing in another process region of the server. Thus, if server region 68 attempts to recover the work associated with those records and the work associated with those records still needs to be resolved by their own server region, the in-flight work of another region would be adversely affected. Thus, there is a continuing need to provide a more systematic way for resolving these protected resource conflicts and failures.

Figure 3:
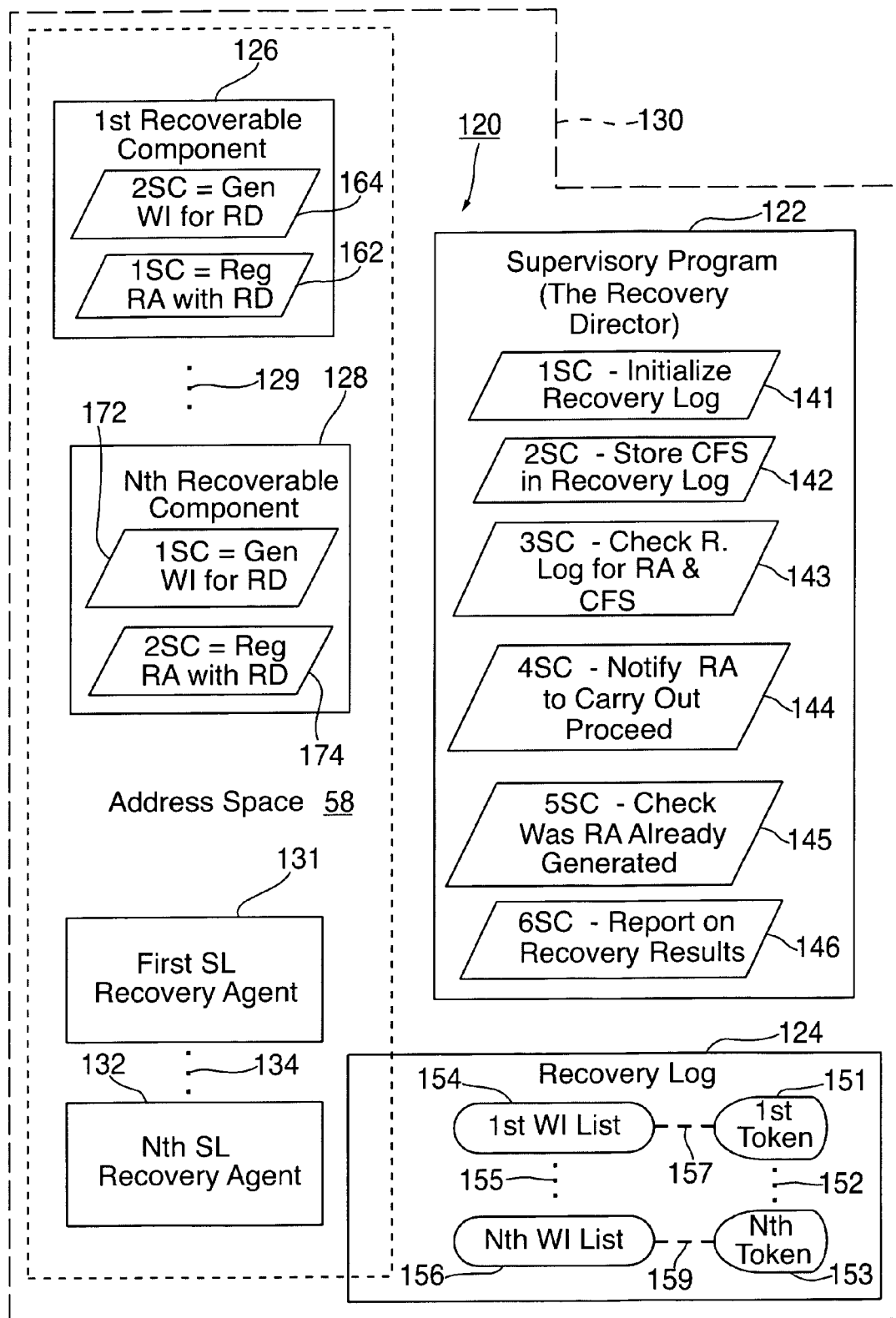
FIG. 3 is a simplified block diagram of the nested recovery scope management system of the present invention showing various elements thereof including a supervisory program called the Recovery Director, a recovery log, selected portions of a plurality of recoverable components, and a plurality of stateless recovery agents.

FIG. 3 is a simplified block diagram of the elements of a nested recovery scope management system 120 of the present invention for use in a multiple process computer system 130. Computer system 130 is just like computer system 58 shown in FIG. 2 but in addition, it has a recovery management system 120 installed therein. System 120 which is specifically designed and operable to handle the above-mentioned problems which can occur in a multiple process server environment.

FIG. 3 shows the major elements of a nested recovery scope management (NRSM) system 120 of the present invention for use in a multiple process computer system 130 represented by the large dashed block in FIG. 3. The elements of system 120 will now be identified in FIG. 3, and their operation and methods of the present invention explained in detail in connection with FIGS. 4 through 7.

As shown in FIG. 3, NRSM system 120 includes the following: a supervisory program 122 containing certain subprograms; a recovery log 124 operable to hold certain information; at least a first recoverable component 126, and in practice, at least a second recoverable component 128, and possibly many more such components as indicated by ellipses 129; and at least a first stateless recovery agent 131. If desired, a second type of stateless recovery agent 132 may be provided, and even further types may be provided as indicated by ellipses 134. Supervisory program 122, called the Recovery Director, may, if desired, be written as a component in an object-oriented language. Program 122 includes several subprograms 141 through 146, which may be referred to as subcomponents or subroutines. Associated with the recovery log 124 are multiple failure scope tokens, as illustrated by first token 151, ellipses 152 and the Nth token 153, and optionally, multiple work identifiers, as illustrated by first work identifiers set 154, ellipses 155 and the Nth work identifier set 156. The first work identifier set 154 has a certain relationship with the first token 151 as indicated by the dashed line 157 there between, and similarly the Nth work set 156 has a certain relationship with the Nth token 153, as indicated by dashed line 159, which relationships will shortly become clear from further details provided below. Also, first recoverable component 126 has associated therewith two subcomponents or subroutines 162 and 164, as shown. Similarly, every other recoverable component, has associated therewith to such components or subroutines, as indicated by the Nth recoverable component 128 being shown with to subcomponents 172 and 174.

The first subcomponent 141 of the Recovery Director 122 is program code associated with initializing the recovery log. The second subcomponent 142 is for program code associated with storing the failure scopes and references to stateless recovery agents in the recovery log. The third subcomponent 143 is program code for checking the recovery log for recovery agents and determining the current failure scope (CFS). The fourth subcomponent 141 is program code associated with notifying a recovery agent to carry out a recovery procedure. The fifth subcomponent 145 is program code associated with checking whether the recovery agent was already registered. The sixth subcomponent 146 is program code associated with the reporting of data received from or summarizing recovery agent operations to other management programs within computer system 30. The first subcomponent 162 is program code associated with registering the recovery agent with the recovery Director 122. The second subcomponent 164 within the first recoverable component 126 is program code associated with generating work identifiers and associating them with the failure scope token provided by the Recovery Director 122 for an recovery agent associated therewith. The other recoverable components used as part of the present invention also have first and second subcomponents performing the same kind of functions as subcomponents 162 and 164, as indicated by the identical labels provided on the subcomponents 172 and 174 shown the part of the Nth recoverable component 128. The purpose for all the subcomponents will become clear with the explanation of FIGS. 4 through 7.

Figure 4:
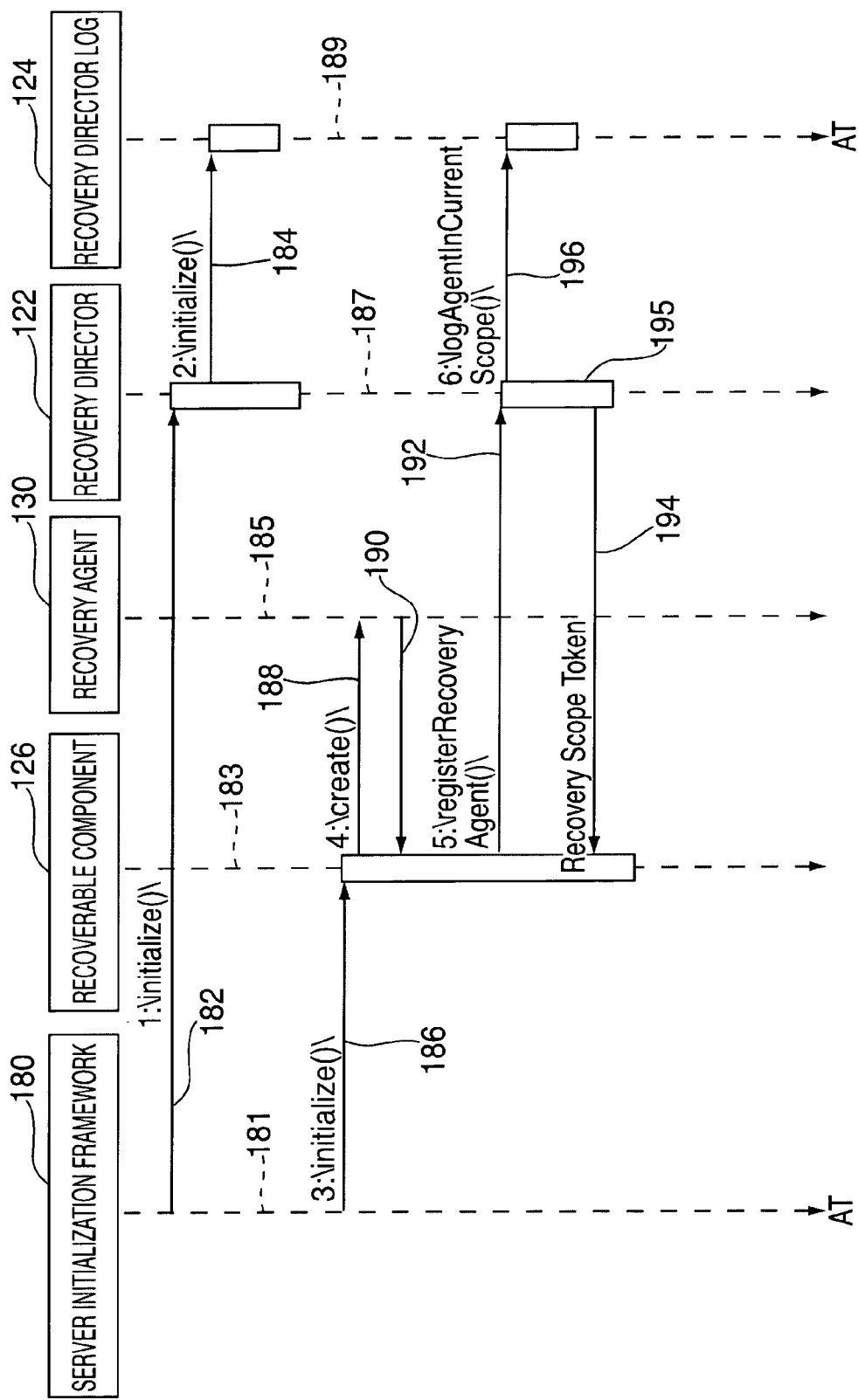
FIG. 4 is a sequence interaction diagram and FIG. 5 is a flowchart, both of which show and help illustrate one method of the present invention, namely the sequence of events associated with the initialization of the FIG. 3 recovery scope management system and the subsequent registration of a first stateless recovery agent with the Recovery Director.
Figure 5:
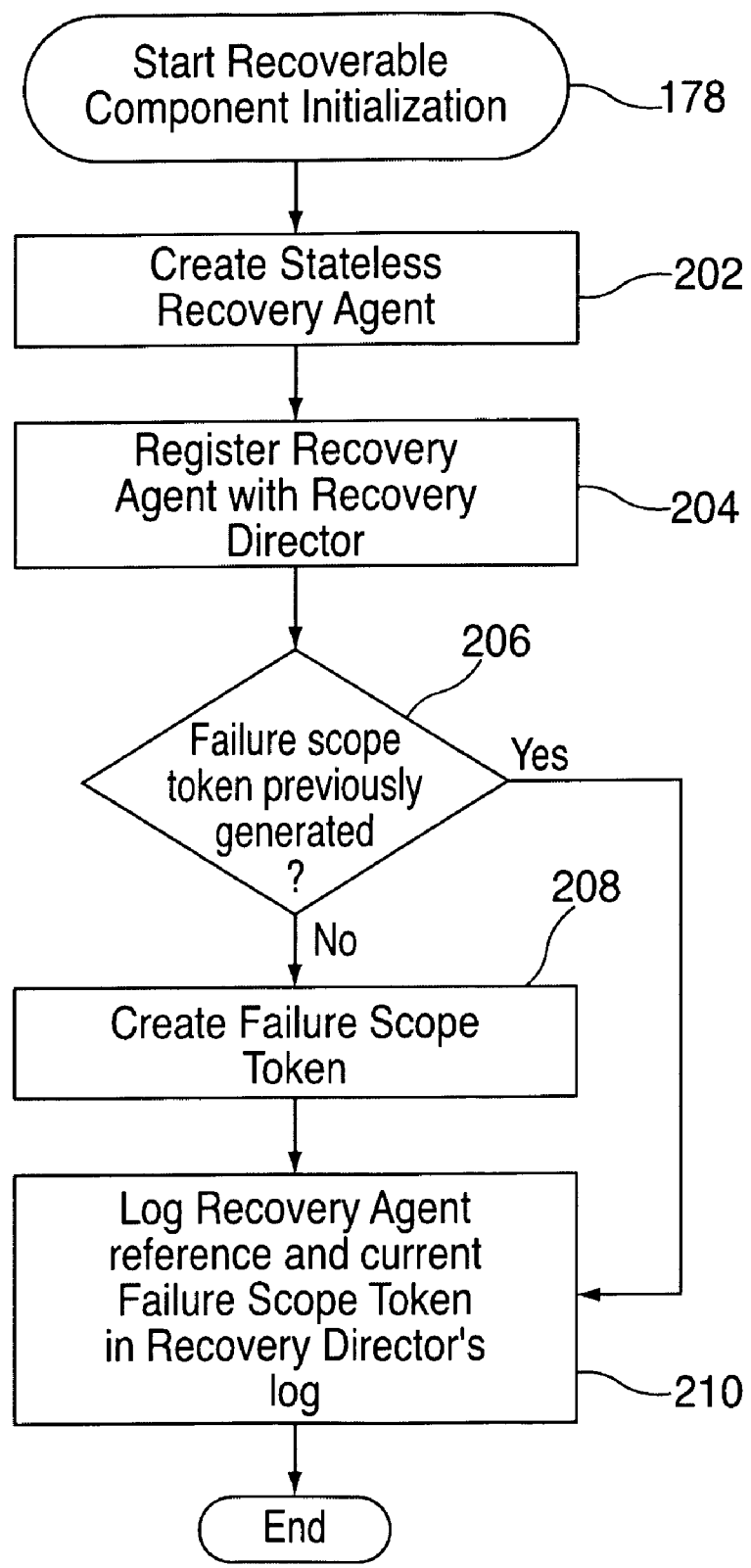

FIG. 4 is a sequence diagram showing the relationship between events and certain elements of the management system 120 of the present invention during registration of stateless recovery agent with the recovery Director. FIG. 5 is a flowchart of this same process, which starts as entry point 178, which is used to initialize all recoverable components as they are started. This process involves registering an associated recovery agent with the Recovery Director 122, which in turn involves identifying a scope of work, creating a token and making certain recovery log entries. As such, FIGS. 4 and 5 provide the sequencing and interaction of certain elements or components during the start-up portion of the systems and methods of the present invention.

Referring now to FIGS. 4 and 5, when the first address space of the server system, such as computer system 30, in which the present invention is utilized is started, as indicated by block 180 entitled Server Initialization Framework, the Recovery Director 122 is initialized, and this action is indicated by horizontal arrow 182 in FIG. 4 that extends from association-time (AT) line 181 downwardly depending from framework block 180 to AT line 187 which depend downwardly from the block 122 labeled Recovery Director. Second, the Recovery Director 120 initializes its recovery log 124, as horizontal arrow 184 in FIG. 4 extending between the vertical line 187 downwardly depending from the Recovery Director block 122 to the vertical line 189 downwardly depending from block 124 labeled recovery log. Third, each recoverable component is initialized, and this process 178 is detailed somewhat further in FIG. 5. It begins, as exemplified by horizontal arrow 186 in FIG. 4, extending from vertical AT line 181 to AT line 183 downwardly depending from block 126 labeled recoverable component. Fourth, the recoverable component creates a stateless recovery agent, as indicated by block 202 in FIG. 5 and by horizontal arrow 188 in FIG. 4 extending between AT line 183 and AT line 185 downwardly depending from block 130 labeled recovery agent. The recovery agent 130 confirms its assignment with the recoverable component 126 as indicated by horizontal arrow 190 pointed to the left from vertical line 185.

Fifth, the process of registering the recovery agent with the Recovery Director, as indicated by block 204 in FIG. 5 is commenced. This process includes a few steps, and its start is indicated in FIG. 4 by horizontal arrow 192 extending between vertical lines 183 and 187. As indicated by decision diamond 206 in FIG. 5, an inquiry is made initially to determine whether a failure scope token was previously generated by the Recovery Director in connection with this particular recoverable component. If the answer is yes, then the process moves to the sixth step, indicated by block 210 in FIG. 5, which will be described very shortly. If the answer is no, then a failure scope token is created as indicated in FIG. 4 at action segment 195, and as indicated in FIG. 5 by block 208. In either case, the recovery scope token which has been created by the Recovery Director for this particular recoverable component will be passed to the recoverable component as shown in FIG. 4 by horizontal arrow 194. (It could be done immediately, but preferably is done as the seventh step of the FIG. 4 sequence, as indicated below.) Sixth, as indicated by block 210 in FIG. 5 and in FIG. 4 by horizontal arrow 196 extending from action segment 195 to AT line 189, the Recovery Director 122 logs the created recovery scope token into the recovery log 124, as indicated by horizontal arrow 196.

To summarize, as part of this initialization process, each recoverable component registers itself with the Recovery Director, and provides the Recovery Director with a reference to its stateless recovery agent. Preferably, the reference provided is an indirect reference so that it can be activated and/or executed in any address space that lives within the resource sharing group. This reference is also used by the recovery agent to identify and group multiple instances of the same recoverable component. Preferably, in response to the recovery component's registration, the Recovery Director 120 will return a token or object reference that represents the current failure scope to the recovery component 126, as indicated by horizontal arrow 194 pointed to the left. This action then represents the seventh step detailed in the FIG. 4 sequence diagram. Thus, the Recovery Director either uses a failure scope token that has been previously generated, or, if one had not already been generated, it creates a failure scope token as part of the FIG. 4 sequence. The recoverable component may then use this token as part of the work identifiers or names it creates for recoverable operations or associate the failure scope with such operations in some other manner. The Recovery Director maintains a recovery log. The recovery agent reference associated with each recoverable component and the related failure scope token are entered into this recovery log, as noted before in block 210 of FIG. 5, and arrow 196 in FIG. 4.

Figure 6:
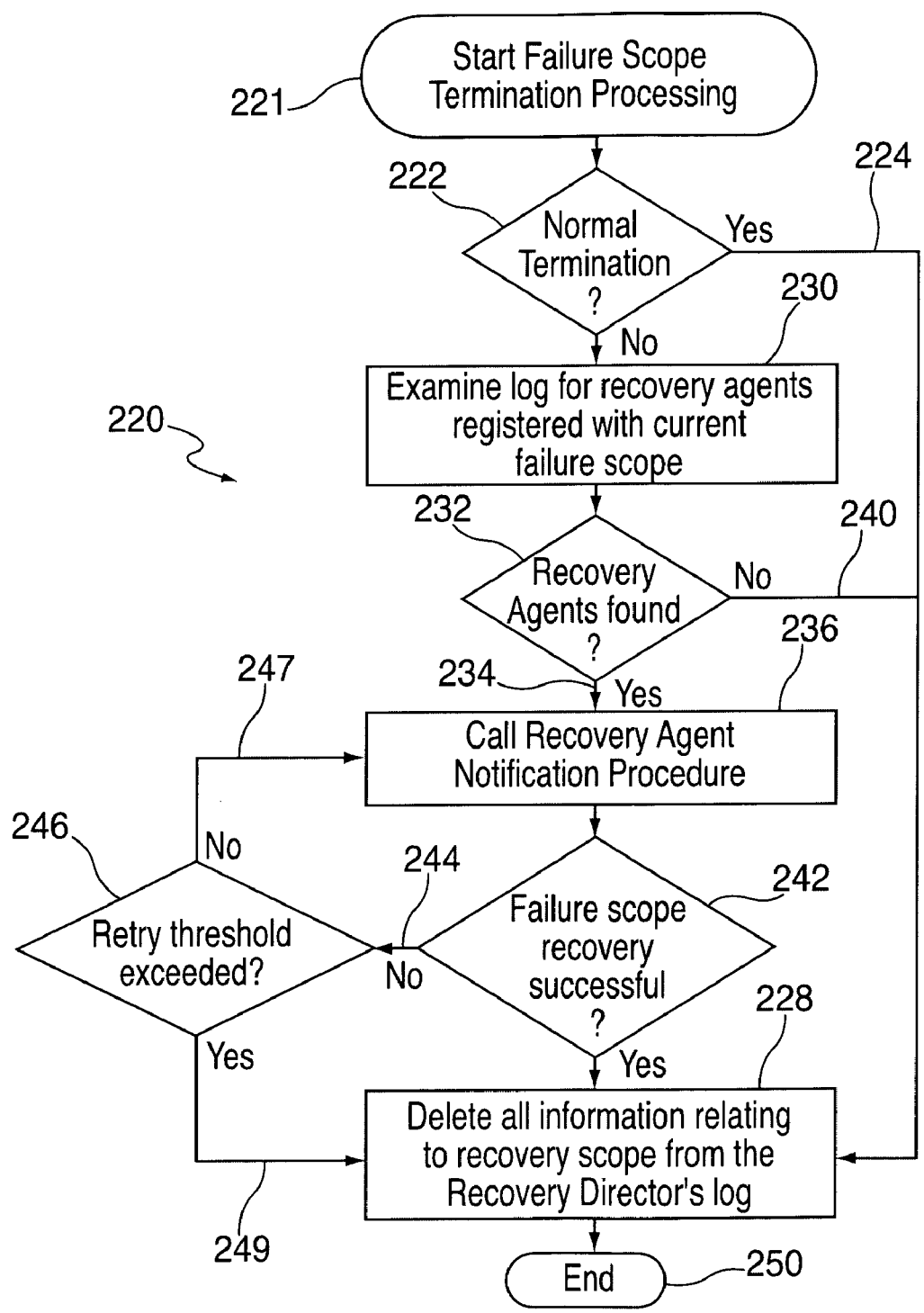
FIG. 6 is a flowchart showing the failure recovery processing as implemented and supervised by the Recovery Director once an event has occurred which triggers the start of failure scope termination processing.

FIG. 6 describes the steps of the present invention involved in failure scope termination processing 220 associated with each recoverable component. This processing 220 starts at entry point 221. In the event that a failure is discovered by any management system or process in the computer system 30 and the Recovery Director 122 is so notified, the Recovery Director is responsible for determining the scope of that failure. First, as indicated by decision diamond 222, the Recovery Director determines whether there was a normal termination or an abnormal termination. If the transaction or process terminated normally, then there was no failure, and YES path 224 is followed down to block 228, where as indicated, all information related to the recovery scope is deleted from the Recovery Director's recovery log.

If the Recovery Director determines that there was a failure, then the Recovery Director examines its recovery log for recovery agents that are registered with the current failure scope, as shown in block 230. If recovery agents are found within the current failure scope, as indicated by YES path 234 leading away from decision diamond 232, the Recovery Director is at this point required to call each of these recovery agents and provide them with a reference to the current recovery scope. This is indicated by block 236, which states that the recovery agent notification procedure, which is discussed in detail in connection with FIG. 7, must be called. When a recovery agent is given control, it is only allowed to perform recovery for the specified recovery scope and any scopes nested within it. The nesting is opaque to the recovery agent. Both asynchronous and synchronous requests to the recovery agent are preferably supported, as will be explained further below.

Referring again to FIG. 6, if recovery agents are not found, then as shown by NO path 240, control is passed to block 228, which indicates that all information relating to the recovery scope shall then be deleted from the Recovery Director's log and the failure scope processing ends at end point 250. Again, if a recovery agent is found, as shown by path 234, then the "Recovery Agent Notification Procedure" is invoked or called. This procedure allows a recovery agent to look for work within the specified failure scope that requires recovery. If the Recovery Agent Notification (RAN) Procedure successfully recovers work, which inquiry is illustrated by decision diamond 242, then failure scope recovery has been successful, so all information relating to the recovery scope can be deleted from the Recovery Director's log, as stated in block 228, and the Failure Scope Termination Processing will terminate. If the failure scope recovery is not successful, as shown by NO path 244, then, unless the threshold for retrying recovery has been exceeded, as indicated by decision diamond 246, the Recovery Director will continue to try to recover by again invoking or calling the Recovery Agent Notification Procedure, as shown by No path 247. If the failure scope recovery is not successful and if the retry threshold has been exceeded, then as shown by YES path 249, control is passed to block 228, where all information relating to the recovery scope is deleted from the Recovery Director's log and failure scope processing ends at end point 250.

Figure 7:
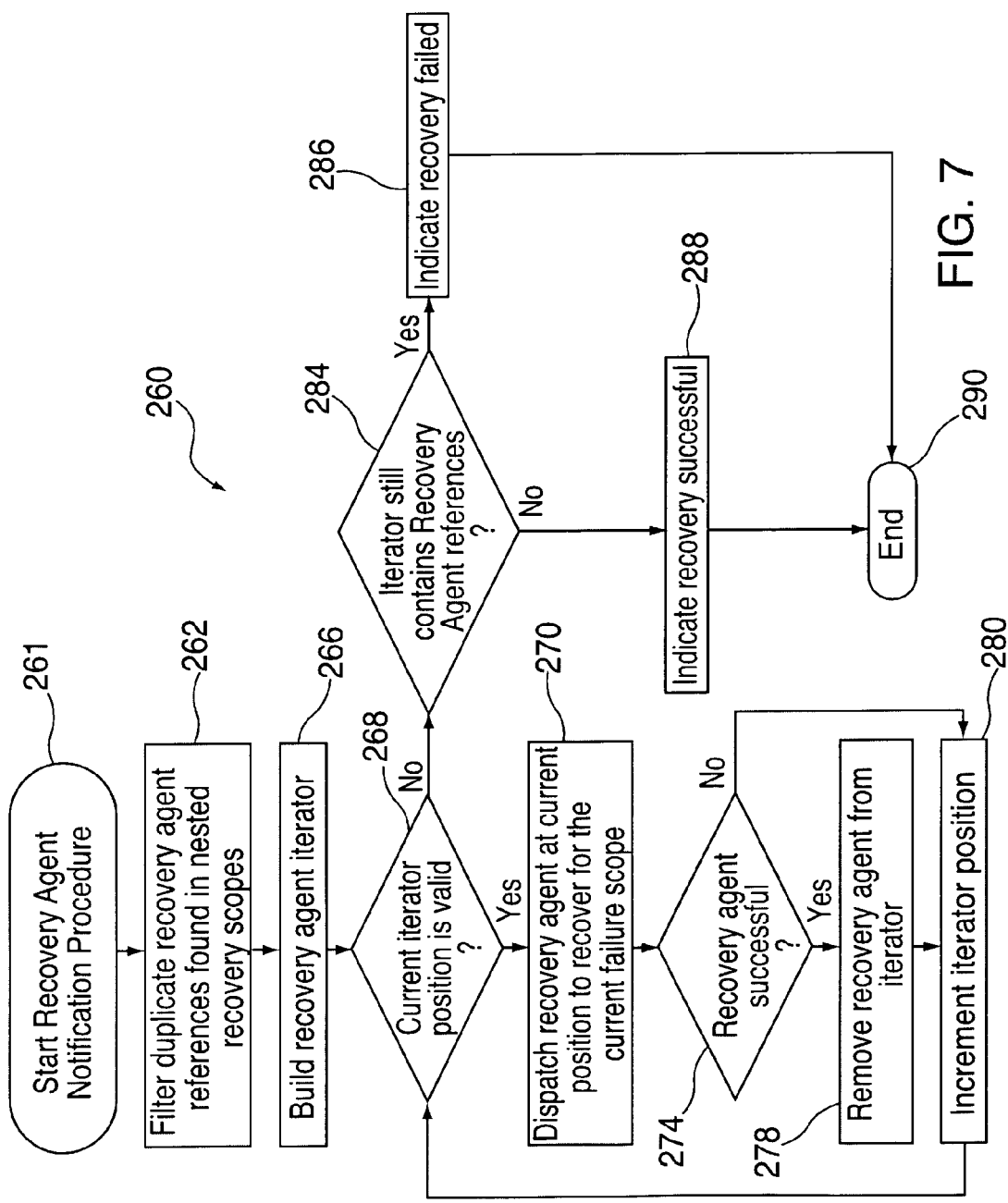
FIG. 7 is a flowchart showing the "Call Recovery Agent Notification Procedure" of FIG. 6 which illustrates steps taken by the stateless recovery agent to carry out any assigned failure scope recovery in accordance with the teachings of the present invention.

FIG. 7 illustrates the steps involved in the Recovery Agent Notification (RAN) Procedure 260. The RAN Procedure is invoked by the Recovery Director, after the Director has found references to recovery agents in the current failure scope by examining the recovery log and noting entries therein for associated recovery agents, which normally will be the case. The procedure begins at entry 261. The recovery agent identified from the recovery log, once notified by the Recovery Director to begin its mission, begins the recovery process at block 262 by filtering the duplicate recovery agent references found in any nested recovery scopes so that recovery may begin at the appropriate level of the nesting and continue until recovery occurs at all the nested levels. Then a recovery agent iterator is built, as indicated at block 266.

Once the recovery iterator has been built, the procedure determines whether the current iterator position is valid as shown by decision diamond 268. If the iterator position is valid, then the recovery agent is sent to the current iterator position to recover for the current failure scope, as shown in block 270. Then the procedure inquires whether the recovery agent was successful, as shown in decision diamond 274. If the recovery agent is successful, the recovery agent is removed from the recovery agent iterator, as shown in block 278. Then the recovery iterator position is incremented as shown in block 280, and the sequence of steps beginning with decision block 268 are repeated. If the iterator position is not valid, then the process proceeds to decision diamond 284 to determine whether the iterator still contains recovery agent references. If the current iterator position is not valid and the iterator still contains recovery agent references, then as shown in block 286, this means that the recovery has failed, and this fact is indicated. In other words, the RAN Procedure will indicate to the Recovery Director (and/or other system components, if desired) that recovery failed. Then the RAN Procedure will terminate as shown by the path leading to end point 290. If the current iterator position, as determined in decision block 268, is not valid and the iterator, as shown in decision block 284, does not contains recovery agent references, then the recovery has been successful and the RAN Procedure will so indicate, as shown in block 288. After indicating that recovery was successful, the RAN Procedure will terminate, as shown by the path leading to end point 290.

Usage in Clusters or Other Resource Sharing Groups. In computer systems of the type shown in FIG. 1, each of the servers, comprised of Controllers and Servants described above, can be configured into a cluster. When defined in a cluster, several common resources must be accessible to all servers. When the resources are accessible to all servers in a cluster, this configuration is considered to be part of what is known as a resource sharing group. In the server environment, known software, including the work load management software previously mentioned, provides for the allocation and balancing of work among the several processors, and the control and servant server processes associated therewith. In such server environment, it is useful to have these multiple processors which are operating together cooperate in a manner which provides a single server image to the clients. The multi-process servers can be combined into one or more clusters each of which require access to a set of common resources. When these resources are available to all servers in a cluster, the cluster is considered to be a resource sharing group, as previously noted. A single multi-process server (which includes one or more Controllers and their associated Servants) is implicitly a resource sharing group.

Application to the techniques of the present invention, as described above, can be applied in such a resource sharing group. The Recovery Director can be used to direct another server in the resource sharing group to recover a failed resource, such as an entire server in that group. The recovery method used is the same as for a partial server failure, which was described above. A recovery agent in one of the remaining controllers is provided with information about the failure scope. Then, this recovery agent can dispatch recovery for the failed scope.

Different Types of Recovervy Agents. Different kinds of protected resources or different kinds of transactions within a large computer system may require different steps to be carried out in order to affect recovery. Accordingly, it may be useful to have two or more different kinds of stateless recovery agents, with each one being constructed to perform the recovery operations that are associated with a particular kind of protected resource or particular kind of transaction that requires special handling. The use of two or more different recovery agents is within the scope of the present invention.

Synchronous and Asynchronous Uses. The stateless recovery agents of the present invention may be used synchronously. By "synchronous use" we mean a use where the recovery agent is sent to perform a recovery for a certain scope, and will not be sent out to perform recovery for another scope until the agent returns from the first recovery scope. Alternatively, the multiple recovery agents may be sent out by the Recovery Director concurrently, or may be sent out at timed intervals, without waiting for response or the completion of an earlier recovery scope by the same or different agent. These would be examples of what we characterized as an "asynchronous use" of recovery agents.

Reporting & Exceptions Activity. It is also within the scope of the present invention for the Recovery Director and/or the stateless recovery agents to have a subprogram or other function that provides data and/or some form of statistics relative to its activities to other programs such as transaction managers, resource managers and/or system managers and/or monitors regarding their operations. Such data may include recovery results achieved, volume and type of recovery operations pursued, levels of nesting employed, numbers of duplicate recovery activities identified and eliminated, and the like. The reporting of data in turn may help these other systems provide useful reports or determine whether corrective or preventative action need be taken.

Software Coding Implementations. It should be appreciated that in a run-time environment consisting primarily of programs using object-oriented programming (OOP) techniques, the Recovery Director may be implemented as a component, and the stateless recovery agent may also be implemented as a component. Further, when the stateless recovery agent is executing, it in effect becomes an object in such an environment. It should also be appreciated that more than one stateless recovery agent may be provided, if desired. For example, if different recoverable components have different attributes which require different steps for recovery, it may be useful to provide different recovery agents specifically written to handle the required recovery tasks. The present invention has been described with respect to an implementation on an IBM z900 series multi-processor computer system running under IBM's z/OS operating system and it may beneficially be added as part of and run under the control of the WebSphere application server management software package. Yet, those in the art should appreciate that the systems and method of the present invention may be utilized within the other known or suitable computer systems having multiple processes which utilize a dynamic multiple address space.

The systems and methods of the present invention need not be further described here since those skilled in the art, based on the teachings of the present invention, will readily understand how to implement the same. This in part is due to the widespread use of conventional automatic data recovery software and management tools in large computer systems in order to provide for a more graceful recovery from server failures and other sources of partial or total abnormal terminations. Any suitable programming approaches and/or other well-known protocols and tools familiar to those writing operating system and management system programs and/or components, including those used in object-oriented distributed computing environments, may be used to help code the software required to implement the nested recovery scope management systems and methods of the present invention. For example, the systems and processes of the present invention may be written as programs or a set of interrelated routines in any suitable programming language, such as but not limited to an object-oriented language and then deployed to run under the control of any suitable management software package including an operating system if desired.

The present invention has been described in part by reference to block and flow diagrams and elements of systems and steps of methods. As is well known, suitable program instructions provided in software are used to turn general purpose computers and/or processors into programmed computers and/or processors to form systems capable of carrying out the teachings of the present invention.

Firm ware & Other Implementations. It should be appreciated by those skilled in the art that if desired, the systems, methods and software described herein may be implemented in part in firmware (including microcode) or hardware. Accordingly, the present invention may take the form of an embodiment including hardware and/or firmware, or an embodiment that is a combination of software, hardware and/or firmware. Further, the methods of the present invention may be carried out entirely in software, or in a combination of the software, hardware and/or firmware.

Tangible Media as an Implementation. Also, the software or other coding employed to implement the present invention may be provided in any suitable form of computer program code embodied in tangible media, such as but not limited to floppy diskettes, CD-ROMs, hard drives, static or flash memory, gate arrays, or any other computer readable storage medium. When such computer program code or other code, containing the needed instructions, is loaded into and is ready for execution by suitable computers/processors, such programmed computers/processors become an apparatus for practicing the invention. Thus, it should be appreciated that another embodiment of the present invention is the computer program code needed for carrying out the processes of the present invention when it is embodied in a tangible medium.

Further Variations/Additions. The foregoing detailed description shows that the exemplary embodiments of the present invention are well suited to fulfill the purposes above-stated. It is recognized that those skilled in the art may make various modifications or additions to the embodiments chosen to illustrate the present invention without departing from the spirit and proper scope of the invention. Accordingly, it is to be understood that the protection sought and to be afforded hereby should be deemed to extend to the subject matter defined by the appended claims, including all fair equivalents thereof.

What is claimed is:

1. A nested recovery scope management system for use in a computer system having a dynamic multiple address space server environment, the system comprising:

a processor to execute:

a supervisory program for directing recovery of protected resources, the supervisory program including a first subcomponent for initializing a recovery log, and a second subcomponent for storing failure scope tokens and recovery agent references in the recovery log, a third subcomponent for examining the recovery log for agents registered therewith and any current failure scope, and a fourth component for selectively notifying the recovery agent to carry out a recovery procedure;

the recovery log used by the supervisory program for storing information about recovery agents registered within a recovery scope;

a first recoverable component having therein a first recoverable subcomponent for generating work identifiers containing the failure scope token or associated with such token that represents recoverable operations that may need to be performed at a later time, and a second recoverable subcomponent for registering the recovery agent with the supervisory program; and a first stateless recovery agent identified in response to the initialization of the first recoverable component, the first stateless recovery agent being operable to assist in performing recovery operations in connection with the first recoverable component when instructed to do so by the supervisory program, the first stateless recovery agent also being operable to utilize work identifiers from the recovery log in order to perform recovery operations in connection with a first associated component;

wherein the supervisory program generates tokens used to reference stored work identifiers associated with recoverable components, and the recovery agent is also operable to utilize the token received from the supervisory program as well as the stored work identifiers in the recovery log in order to perform recoverable operations in connection with at least the first associated component wherein the supervisory program directs removal of work identifiers and token information associated with the first recoverable component from the recovery log when recovery operations associated with the first recoverable component have been successfully completed.

2. A nested recovery scope management system for use in a computer system having a dynamic multiple address space server environment, the system comprising:

a processor to execute;

a supervisory program for directing recovery of protected resources, the supervisory program including a first subcomponent for initializing a recovery log, and a second subcomponent for storing failure scope tokens and recovery agent references in the recovery log, a third subcomponent for examining the recovery log for agents registered therewith and any current failure scope, and a fourth component for selectively notifying the recovery agent to carry out a recovery procedure;

the recovery log used by the supervisory program for storing information about recovery agents registered within a recovery scope;

a first recoverable component having therein a first recoverable subcomponent for generating work identifies containing the failure scope token or associated with such token that represents recoverable operations to be performed at a later time, and a second recoverable subcomponent for registering the recovery agent with the supervisory program; and a first stateless recovery agent identified in response to initialization of the first recoverable component, the first stateless recovery agent being operable to assist in performing recoverable operations in connections with the first recoverable component when instructed to do so by the supervisory program, the first stateless recovery agent also being operable to utilize work identifiers from the recovery log in order to perform recovery operations in connection with a first associated component;

wherein the supervisory program generates tokens used to reference stored work identifiers associated with recoverable components;

the recovery agent is also operable to utilize a token received from the supervisory program as well as the stored work identifiers in the recovery log in order to perform recoverable operations in connection with at least the first associated component;

wherein the supervisory program filters duplicate recovery agent references found in recovery scopes stored within the recovery log;

wherein the supervisory program builds a recovery agent iterator that utilizes at least a first ordered list of agents to be dispatched to perform recovery for an identified failure scope that may be in need of recovery successively, upon the recovery agent reporting back from an earlier recovery assignment.

3. A management system as in claim 2, wherein the supervisory program directs removal of work identifiers and token information associated with the first recoverable component associated therewith from the recovery log when recovery operations associated with the first recoverable component have been successfully completed.

4. A recovery scope management method for use in a multiple process computer system having a plurality of server regions assigned to a shared resource group which regions include a dynamic multiple address space, the method being for assisting in the recovery and restoration of protected resources available to the shared resource group, the method comprising:

(a) installing a supervisory program for directing the recovery of protected resources whose processing was abnormally terminated, and initializing the supervisory program when a first address space of a server region within the computer system is started;

(b) as each instance of a recoverable component is initialized, registering that component with the supervisory program by providing the supervisory program a reference to a stateless recovery agent that is able to perform recovery functions associated with that instance of the recoverable component;

(c) for each recoverable component, creating work identifiers for recoverable operations to be performed if an abnormal termination occurs using at least in part information associated with the reference or token provided to the recoverable component;

(d) employing the supervisory program to identify and group multiple instances of the same recoverable component;

(e) upon the occurrence of the abnormal termination, having the supervisory program detennine a recovery scope by examining stored data for failure scopes to identify data processing operations that may not have been completed and have not been recovered, which identified data processing operations are referred to as incomplete failure scopes, and (f) as incomplete failure scopes are identified, having the supervisory program obtain the reference to each stateless recovery agent associated with such scopes;

(g) after obtaining each such reference, using the supervisory program to call each such stateless recovery agent and providing such agent with the token representing the recovery scope; and (h) passing control to the recovery agent to allow the rccovery agent to perform recovery for the specified recovery scope it received via the token, including any recovery scopes nested within it.

5. The recovery scope management method of claim 4, wherein step (e) is performed by the recoverable component itself.

6. The recovery scope management method of claim 4, wherein step (d) is performed at least in part by having the supervisory program cause the token to be returned that references a current failure scope of that instance of the recoverable component.

7. The recovery scope management method of claim 4, wherein at least one stateless recovery agent facilitates peer level recovery across the resource sharing group.

8. The recovery scope management method of claim 4, wherein, as part of step (e), the supervisory program determines when some form of recovery somewhere within the resource sharing group is required.

9. The recovery scope management method of claim 4, further comprising the step of:

(i) through the supervisory program, driving an instance of the stateless recovery agent into at least two active process areas within the resource sharing group.

10. The recovery scope management method of claim 9, wherein the active process areas within the resource sharing group are selected from the group of active process areas including, but not limited to, a cluster, a server, a server region, a thread pool, a thread, and a unit of work.

11. The recovery scope management method of claim 4, wherein, as part of step (h) the stateless recovery agent utilizes the recoverable component that looks for work within the failure scope specified via the token that may need recovery.

12. The recovery scope management method of claim 4, wherein, as part of step (d) having the supervisory program nest the failure scopes, such that larger recovery scopes encompass smaller recovery scopes in accordance with a following large-to-small paradigm of cluster, server, server region, thread pool, pool and unit of work, whereby restart and recovery issues associated with component initialization in the Nth address space of a server no longer exist.

13. A computer program product, for and to be used within a multiple processor computer system having a shared dynamic multiple address space server enviromnent, in order to implement a nested recovery scope management method which employs at least one stateless agent, the software product comprising: a storage medium readable by at least one processing circuit and storing instructions for execution by the processing circuit for performing a method comprising the steps of
- (a) installing a supervisory program for directing the recovery of protected resources whose processing was abnormally terminated, and initializing the supervisory program when a first address space of a sewer within the computer system is started;
- (b) as each instance of a recoverable component is initialized, registering that component with the supervisory program, by providing the supervisory program with a reference to a stateless recovery agent that is able to perform recovery functions associated with that instance of the recoverable component;
- (c) for each recoverable component, creating work identifiers for recoverable operations to be performed if an abnormal termination occurs using at least in part information associated with the reference provided to the recoverable component;
- (d) employing the supervisory program to identify and group multiple instances of the same recoverable component;
- (e) upon the occurrence of the abnormal termination, having the supervisory program determine a recovery scope by examining stored data for failure scopes to identify data processing operations that may not have been completed and have not been recovered, which identified data processing operations are referred to as incomplete failure scopes, and
- (f) as incomplete failure scopes are identified, having the supervisory program obtain the reference to each stateless recovery agent associated with such scopes;
- (g) after obtaining each such reference, using the supervisory program to call each such stateless recovery agent and providing such agent with a token to the recovery scope; and
- (h) passing control to the recovery agent to allow the recovery agent to perform recovery for the specified recovery scope it received via the token, including any recovery scopes nested within it.

* * * * *